(12) United States Patent
Hirata

(10) Patent No.: US 12,172,500 B2
(45) Date of Patent: Dec. 24, 2024

(54) VEHICLE WINDOW GLASS

(71) Applicant: Central Glass Products Co., Ltd., Matsusaka (JP)

(72) Inventor: Naoya Hirata, Matsusaka (JP)

(73) Assignee: Central Glass Products Co., Ltd., Matsusaka (JP)

( * ) Notice: Subject to any disclaimer, the term of this patent is extended or adjusted under 35 U.S.C. 154(b) by 397 days.

(21) Appl. No.: 17/774,766

(22) PCT Filed: Oct. 28, 2020

(86) PCT No.: PCT/JP2020/040425
§ 371 (c)(1),
(2) Date: May 5, 2022

(87) PCT Pub. No.: WO2021/090744
PCT Pub. Date: May 14, 2021

(65) Prior Publication Data
US 2022/0402337 A1    Dec. 22, 2022

(30) Foreign Application Priority Data

Nov. 6, 2019 (JP) .................................. 2019-201480
Jan. 30, 2020 (JP) .................................. 2020-014047

(51) Int. Cl.
*B32B 17/06* (2006.01)
*B32B 15/04* (2006.01)
(Continued)

(52) U.S. Cl.
CPC ......... *B60J 1/001* (2013.01); *B32B 17/10036* (2013.01); *B32B 17/10302* (2013.01);
(Continued)

(58) Field of Classification Search
CPC ................. B32B 17/10036; B32B 17/10302
(Continued)

(56) References Cited

U.S. PATENT DOCUMENTS

| 6,086,983 A | 7/2000 | Yoshizawa |
| 2007/0172642 A1* | 7/2007 | Fukatani ............... C08K 5/103 |
| | | 428/323 |

(Continued)

FOREIGN PATENT DOCUMENTS

| EP | 1 785 404 A1 | 5/2007 |
| JP | 8-48547 A | 2/1996 |

(Continued)

OTHER PUBLICATIONS

International Search Report (PCT/ISA/210) issued in PCT Application No. PCT/JP2020/040425 dated Jan. 12, 2021 with English translation (five (5) pages).

(Continued)

*Primary Examiner* — Lauren R Colgan
(74) *Attorney, Agent, or Firm* — Crowell & Moring LLP

(57) ABSTRACT

A vehicle window glass (10) includes a first glass sheet (1), a second glass sheet (2) and an interlayer film (3) sandwiched between a second surface (S2) of the first glass sheet and a third surface (S3) of the second glass sheet. For weight reduction, at least one of the glass sheets (1, 2) has a thickness of 2.0 mm or smaller. The interlayer film (3) has a main part (4) provided with a rigid layer and a peripheral part (5) formed of a non-rigid layer. The peripheral part (5) is disposed along an upper side of the vehicle window glass (10) which is exposed to air. Contact of water with the rigid layer of the main part (4) is prevented by the non-rigid layer of the peripheral part (5). The rigid layer has a water content controlled to 0.5% or lower as measured by near-infrared spectroscopy.

13 Claims, 7 Drawing Sheets

(51) Int. Cl.
  *B32B 17/10*     (2006.01)
  *B32B 27/30*     (2006.01)
  *B60J 1/00*      (2006.01)
  *C03C 3/091*     (2006.01)
  *B32B 7/022*     (2019.01)

(52) U.S. Cl.
  CPC ............ *B32B 27/306* (2013.01); *C03C 3/091* (2013.01); *B32B 7/022* (2019.01); *B32B 2250/03* (2013.01); *B32B 2307/54* (2013.01); *B32B 2307/732* (2013.01); *B32B 2605/006* (2013.01)

(58) Field of Classification Search
  USPC .................................................. 428/426, 428
  See application file for complete search history.

(56) References Cited

U.S. PATENT DOCUMENTS

| | | | |
|---|---|---|---|
| 2016/0082705 A1 | 3/2016 | Fisher et al. | |
| 2016/0250825 A1* | 9/2016 | Cleary | B32B 17/10119 428/215 |
| 2016/0361898 A1* | 12/2016 | Sadakane | B60J 1/02 |
| 2017/0282693 A1* | 10/2017 | Miyasaka | B60J 3/04 |
| 2021/0187901 A1* | 6/2021 | Lakshmanan | B32B 17/10761 |
| 2021/0221101 A1* | 7/2021 | Bronstein | B32B 17/10293 |

FOREIGN PATENT DOCUMENTS

| | | |
|---|---|---|
| JP | 11-60293 A | 3/1999 |
| JP | 2000-302490 A | 10/2000 |
| JP | 2016-539890 A | 12/2016 |
| JP | 2017-186229 A | 10/2017 |
| JP | 6466917 B2 | 2/2019 |
| WO | WO 2006/004162 A1 | 1/2006 |
| WO | WO 2014/098160 A1 | 6/2014 |
| WO | WO 2015/054112 A1 | 4/2015 |

OTHER PUBLICATIONS

Japanese-language Written Opinion (PCT/ISA/237) issued in PCT Application No. PCT/JP2020/040425 dated Jan. 12, 2021 (four (4) pages).
Supplementary European Search Report issued in European Application No. 20885069.3 dated Nov. 7, 2022 (seven (7) pages).

* cited by examiner

VEHICLE WINDOW GLASS

FIELD OF THE INVENTION

The present disclosure relates to a vehicle window glass manufactured using a laminated glass pane.

BACKGROUND ART

With the recent demand for vehicle weight reduction, lighter-weight laminated glass panes are demanded for use as vehicle window glasses. It has been attempted to reduce the weight of laminated glass panes by using thinner glass sheets in the laminated glass panes. Herein, there is a correlation between the thickness of the glass sheets and the rigidity of the laminated glass pane. The thinner the glass sheets, the lower the rigidity of the laminated glass pane. The use of the thinner glass sheets leads to a high risk of visually recognizable elastic deformation occurring on the vehicle window glass under a stress load that can be caused in a daily environment, whereby it becomes difficult to maintain the vehicle window glass in a predetermined shape.

Patent Document 1 discloses a laminated glass pane having a high-rigidity interlayer film between glass sheets so as to, when the glass sheets are thin, compensate for decrease in the rigidity of the laminated glass pane.

Patent Document 2 discloses, as a laminated glass interlayer capable of showing good adhesion performance during long-term use particularly in a high water-content environment or high humidity environment without deteriorations in penetration resistance and glass scattering preventing performance, an interlayer film for a laminated glass pane which contains a polyvinyl acetal resin and a plasticizer and, when a laminated glass pane is manufactured by sandwiching the interlayer film between two glass sheets, exhibits a Pummel value ranging from 3 to 8 at a water content of 1 to 2 wt % as a parameter indicating the adhesion between the interlayer film and the glass sheets.

It is advantageous for the laminated glass pane to have good adhesion between the glass sheets and the interlayer film from the viewpoint of ensuring safety inside the vehicle in the case where an impact is applied to the laminated glass pane. A Pummel test is known as a method of testing the adhesion between the glass sheets and the interlayer film of the laminated glass pane. This test is to judge the degree of exposure of the interlayer film after partial separation of the glass sheets caused by hitting and breaking the laminated glass pane with a hammer. It is described in Patent Document 2 that, in the case of using the glass sheets with a thickness of 2.5 mm, the laminated glass pane with the interlayer film passes the Pummel test without causing separation of the glass sheets even by hitting with a hammer.

When the present inventors conducted the Pummel test on laminated glass panes respectively provided with interlayer films of high-rigidity polyvinyl butyrals (PVB), however, some of the laminated glass panes did not pass the test. The present inventors have studied the cause of these outcomes and found out that: the high-rigidity interlayer film, in a state of being adhered to the glass sheets, has a large tendency to show overtime such a degree of variation in water absorbency as to decide the outcome of the Pummel test, thereby leading to a deterioration in yield, although the reason for this is not clear; and the water absorbency is not in correlation with the water content of the high-rigidity interlayer film as measured in a state of being adhered to the glass sheets.

On the other hand, the present inventors tested interlayer films of polyvinyl butyrals with different rigidity for the water absorbency in a single film state and found out that there is a tendency that the higher the rigidity of the interlayer film, the higher the water absorbency of the interlayer film.

These data suggests that, differently from conventional polyvinyl butyral interlayer films, it is difficult to predict the outcome of the Pummel test on the interlayer film of high-rigidity polyvinyl butyral because the water absorbency of the interlayer film in a single film state is different from that of the interlayer film in a state of being adhered by lamination to glass sheets.

For recent vehicles, more windshield designs have been proposed where end faces of vehicle window glasses are exposed to air (see FIG. 8). When a laminated glass pane having a high-rigidity interlayer film with an end face thereof exposed to air is used for a vehicle window glass, there are increasing chances of absorption of water into the interlayer film at the end side of the vehicle window glass. In particular, there are many chances of contact of water with the interlayer film at the upper side of the vehicle window glass. The risk of interfacial separation between the interlayer film and the glass sheets becomes high at the end side of the vehicle window glass under such conditions as to reproduce the Pummel test.

It is an object of the present disclosure to provide a vehicle window glass using a laminated glass pane in which a high-rigidity interlayer film is laminated between glass sheets so as to compensate for decrease in the rigidity of the laminated glass pane due to the thinning of the glass sheets and, even when an end face of the vehicle window glass is exposed, has a reduced risk of interfacial separation between the interlayer film and the glass sheets at the end side of the vehicle window glass.

PRIOR ART DOCUMENTS

Patent Documents

Patent Document 1: Japanese Patent No. 6466917
Patent Document 2: Japanese Laid-Open Patent Publication No. 2000-302490

SUMMARY OF THE INVENTION

A vehicle window glass according to the present disclosure comprises:
  a first glass sheet having a first surface facing a vehicle exterior side and a second surface located opposite the first surface;
  a second glass sheet having a fourth surface facing a vehicle interior side and a third surface located opposite the fourth surface; and
  an interlayer film sandwiched between the first glass sheet and the second glass sheet and facing the second and third surfaces,
  wherein the interlayer film is arranged such that at least one end face of the interlayer film is exposed to air,
  wherein the interlayer film comprises a main part provided with at least one rigid layer and a peripheral part disposed at a location adjacent to the main part and along at least one side of the vehicle window glass and formed of a non-rigid layer,
  wherein the at least one rigid layer has a water content controlled to 0.5% or lower as measured by near-infrared spectroscopy, and wherein at least one of the first and second glass sheets has a thickness of 2.0 mm or smaller.

The vehicle window glass according to the present disclosure, in which the high-rigidity interlayer film is used to compensate for decrease in the rigidity of the laminated glass pane due to the thinning of the glass sheets, has a reduced risk of interfacial separation between the interlayer film and the glass sheets at the end side of the vehicle window glass.

DETAILED DESCRIPTION OF THE EMBODIMENTS

A vehicle window glass according to the present disclosure includes:
  a first glass sheet having a first surface facing a vehicle exterior side and a second surface located opposite the first surface;
  a second glass sheet having a fourth surface a vehicle interior side and a third surface located opposite the fourth surface; and
  an interlayer film sandwiched between the first glass sheet and the second glass sheet and facing the second and third surfaces,
  wherein at least one end face of the interlayer film is exposed to air,
  wherein the interlayer film has a main part provided with at least one rigid layer and a peripheral part disposed at a location adjacent to the main part and along at least one side of the vehicle window glass and formed of a non-rigid layer,
  wherein the at least one rigid layer has a water content controlled to 0.5% or lower as measured by near-infrared spectroscopy, and
  wherein at least one of the first and second glass sheets has a thickness of 2.0 mm or smaller.

Figure 1:
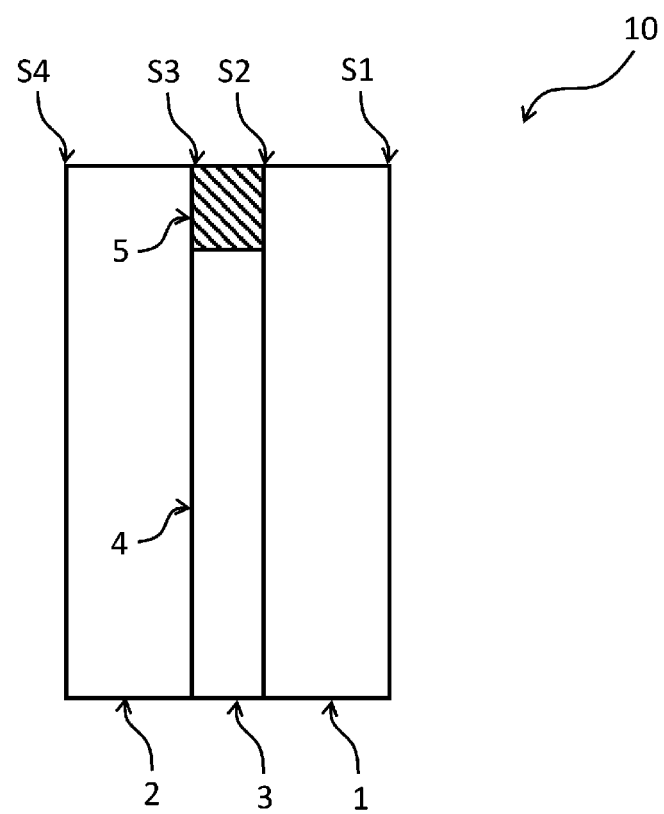
FIG. 1 is a schematic cross-sectional view showing an example of a vehicle window glass according to the present disclosure.

One example of the vehicle window glass according to the present disclosure is schematically shown in cross section in FIG. 1.

In the example of FIG. 1, the vehicle window glass 10 includes a first glass sheet 1, a second glass sheet 2 and an interlayer film 3. The first glass sheet 1 has a first surface S1 facing the vehicle exterior side and a second surface S2 located opposite the first surface S1, whereas the second glass sheet 2 has a fourth surface S4 facing the vehicle interior side and a third surface S3 located opposite the fourth surface S4. The interlayer film 3 is sandwiched between the first glass sheet 1 and the second glass sheet 2 so as to face the second and third surfaces S2 and S3.

[Interlayer Film]

The interlayer film has a main part provided with at least one rigid layer and a peripheral part disposed at a location adjacent to the main part and along at least one side of the window glass and formed of a non-rigid layer.

In the vehicle window glass 10 of FIG. 1, the interlayer film 3 has a main part 4 provided with a rigid layer and a peripheral part 5 formed of a non-rigid layer. The main part 4 and the peripheral part 5 are located adjacent to each other. Further, the peripheral part 5 is disposed so as to lie along at least one side of the vehicle window glass 10.

The main part of the interlayer film is provided with at least one rigid layer as mentioned above.

Herein, the rigid layer refers to a layer having a Young's modulus of 2.5 MPa to 200 MPa at 23° C. In order to compensate for decrease in the rigidity of the lighter-weight laminated glass pane, it is preferable that the Young's modulus of the main part is 2.5 MPa to 200 MPa at 23° C.

For example, the rigid layer can be made of relatively hard PVB, SentryGlas (registered trademark of Dupont), polycarbonate, ionomer, polyethylene terephthalate or any other appropriate polymer material or thermoplastic material. It is preferable that the rigid layer is made of a thermoplastic resin.

In the vehicle window glass according to the present disclosure, the occurrence of interfacial separation between the interlayer film and the glass sheets is effectively suppressed by using the moisture-resistant non-rigid layer to prevent contact of the rigid layer with water. Consequently, the at least one rigid layer of the main part has a water content controlled to 0.5% or lower as measured by near-infrared spectroscopy. The main part may be provided with two or more rigid layers. As long as the main part is provided with at least one rigid layer, the main part may be further provided with any layer other than the rigid layer (such as non-rigid layer).

Other examples of the vehicle window glass according to the present disclosure are schematically shown in cross section in FIGS. 2 to 5.

Figure 2:
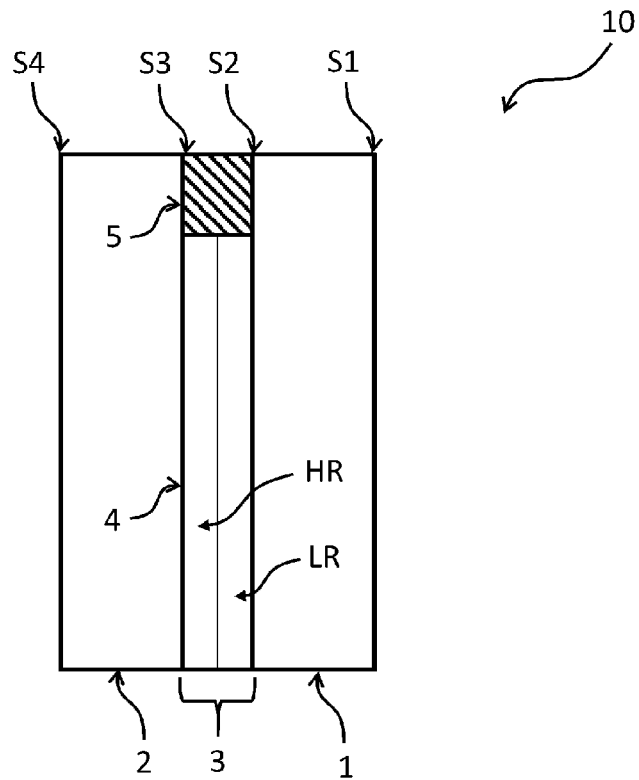
FIG. 2 is a schematic cross-sectional view showing another example of the vehicle window glass.

The vehicle window glass of FIG. 2 is different from that of FIG. 1 in that the interlayer film 3 has a double layer structure consisting of a rigid layer HR disposed on the third surface S3 side and a non-rigid layer LR disposed on the second surface S2 side.

Figure 3:
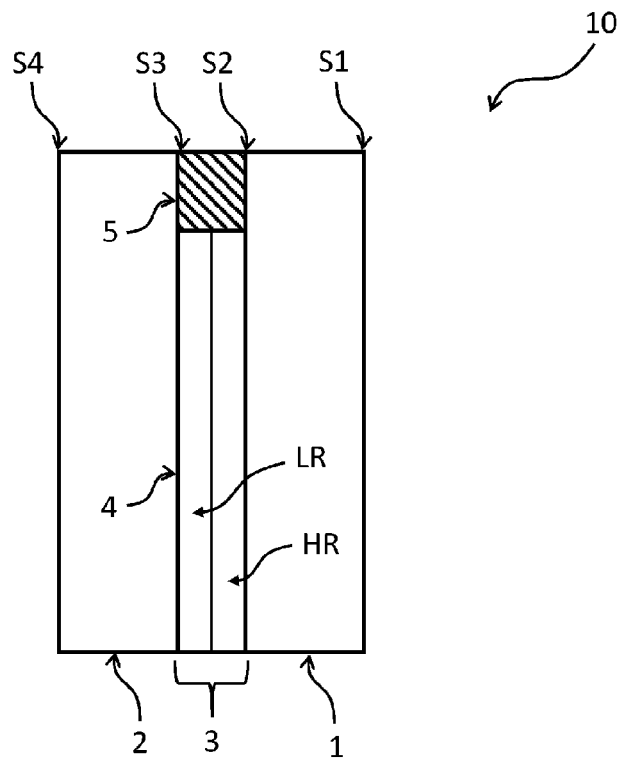
FIG. 3 is a schematic cross-sectional view showing another example of the vehicle window glass.

The vehicle window glass of FIG. 3 is different from that of FIG. 1 in that the interlayer film 3 has a double layer structure consisting of a rigid layer HR disposed on the second surface S2 side and a non-rigid layer LR disposed on the third surface S3 side.

Figure 4:
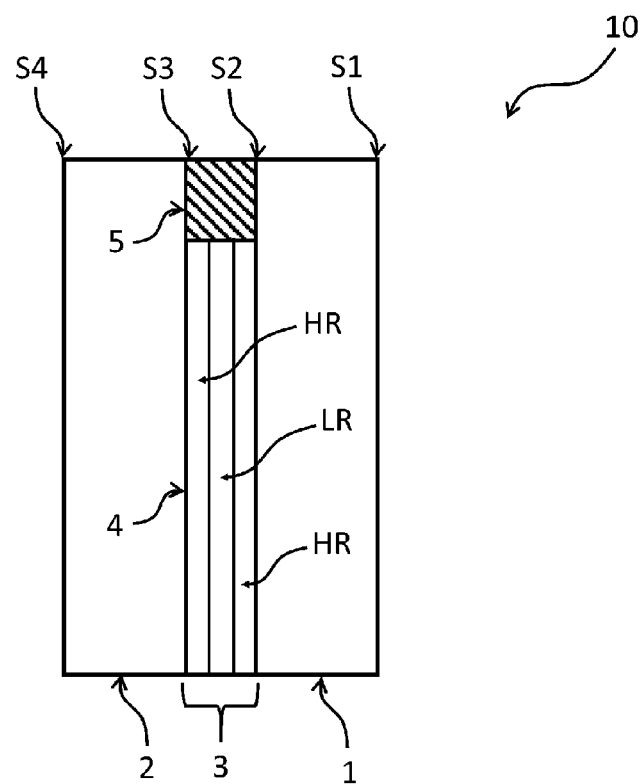
FIG. 4 is a schematic cross-sectional view showing another example of the vehicle window glass.

The vehicle window glass of FIG. 4 is different from that of FIG. 1 in that the interlayer film 3 has a triple layer structure consisting of a rigid layer HR, a non-rigid layer LR and a rigid layer HR.

Figure 5:
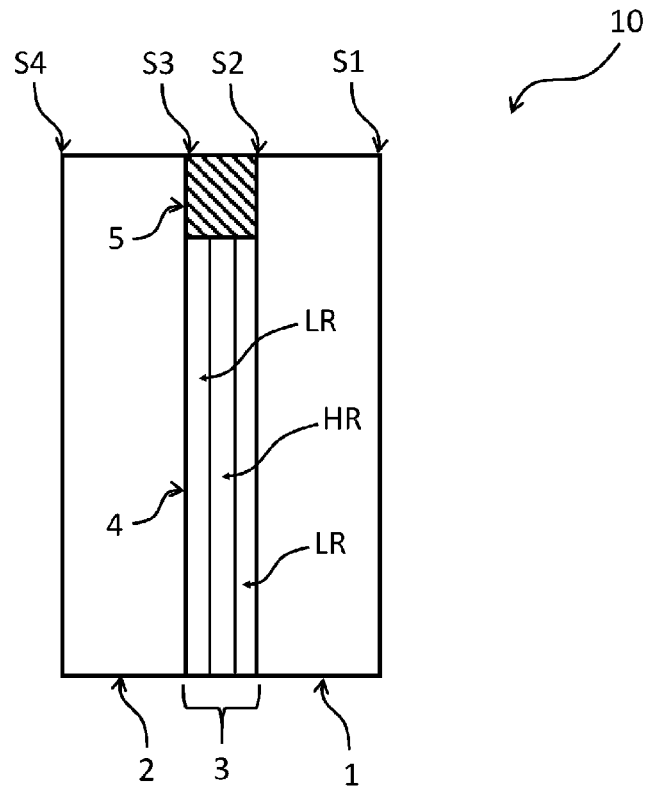
FIG. 5 is a schematic cross-sectional view showing another example of the vehicle window glass.

The vehicle window glass of FIG. 5 is different from that of FIG. 1 in that the interlayer film 3 has a triple layer structure consisting of a non-rigid layer LR, a rigid layer HR and a non-rigid layer LR.

The peripheral part of the interlayer film is formed of a non-rigid layer as mentioned above.

Herein, the non-rigid layer refers to a layer (preferably, a thermoplastic resin layer) having a Young's modulus of 0.1

MPa to 2.0 MPa at 23° C. In order to prevent water or moisture from being absorbed into the main part from the outside of the vehicle laminated glass, it is preferable that the Young's modulus of the peripheral part is 0.1 MPa to 2.0 MPa at 23° C.

The non-rigid layer can be made of relatively soft PVB, acoustic PVB, ethylene-vinyl acetate (EVA), thermoplastic polyurethane (TPU) or any other appropriate polymer material or thermoplastic material.

Figure 6:
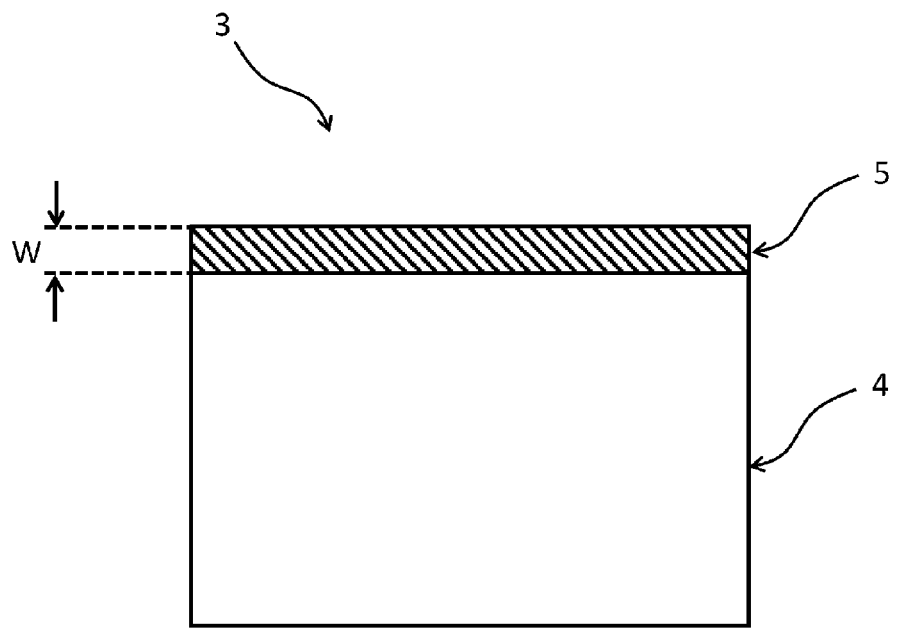
FIG. 6 is a schematic view showing an example of an interlayer film for the vehicle window glass.

One example of the interlayer film used in the vehicle window glass according to the present disclosure is shown in FIG. 6 (as viewed in a thickness direction of the interlayer film). In the interlayer film of FIG. 6, the peripheral part 5 is provided in a strip shape with a width W along one side of the vehicle window glass.

There is no particular limitation on the width of the peripheral part of the interlayer film (i.e. the length of the peripheral part in a direction perpendicular to the one side of the vehicle window glass on which the peripheral part is provided as designated by W in FIG. 6). The width of the peripheral part of the interlayer film is varied according to the design and size of the vehicle window glass. For example, the width W of the peripheral part is preferably 50 mm to 300 mm.

Although the interlayer film is rectangular in shape in the example of FIG. 6, there are no particular limitations on the shapes of the interlayer film, the first and second glass sheets and the vehicle window glass including these film sheets in the present disclosure. For instance, the vehicle window glass may have a partially curved shape (e.g. a shape where the one side of the vehicle window glass along which the peripheral part is provided is curved rather than straight).

There is no particular limitation on the thickness of the interlayer film. For example, the thickness of the interlayer film is preferably 0.5 mm to 3.0 mm.

In the present disclosure, the interlayer film is arranged such that at least one end face of the interlayer film is exposed to air. Further, the interlayer film is provided with at least one rigid layer; and the water content of the at least one rigid layer is controlled to 0.5% or lower as measured by near-infrared spectroscopy.

The peripheral part of the interlayer film is disposed along at least one side of the vehicle window glass. It is preferable that, in a state that the vehicle window glass is mounted to the vehicle, the peripheral part is disposed along the upper side of the vehicle window glass. In a state that the vehicle window glass is mounted to the vehicle, there are many chances of contact of water with the exposed face of the interlayer film at the upper side of the vehicle window glass. Thus, the risk of interfacial separation between the interlayer film and the glass sheets is reduced by disposing the peripheral part, which is formed of the non-rigid layer, along the upper side of the vehicle window glass.

Figure 7:
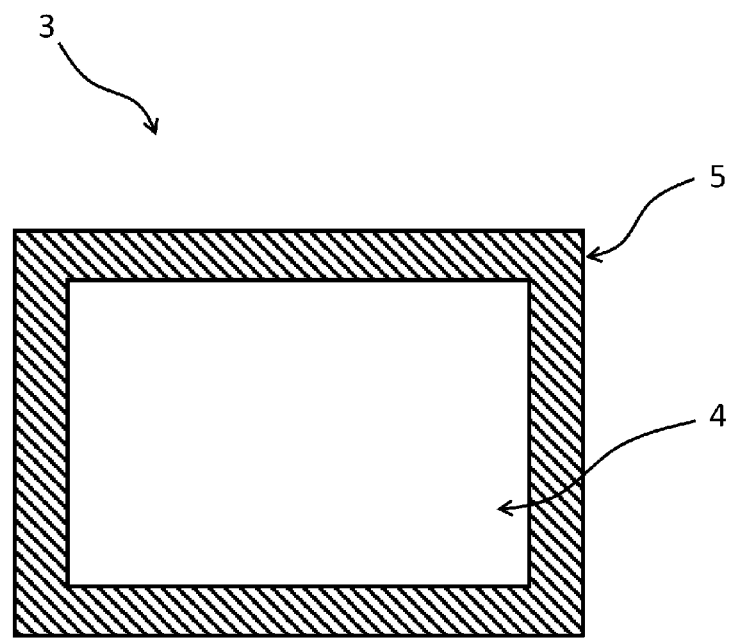
FIG. 7 is a schematic view showing another example of the interlayer film.

The peripheral part of the interlayer film may be disposed along all sides of the vehicle window glass. Such an example of the interlayer film is shown in FIG. 7 (as viewed in the thickness direction of the interlayer film). Since the peripheral part is disposed along all sides of the vehicle window glass, the occurrence of interfacial separation between the interlayer film and the glass sheets is more effectively suppressed by preventing contact of water with the rigid layer of the main part.

There is no particular limitation on the production method of the interlayer film in the present disclosure. The interlayer film can be produced by a known method. For example, it is feasible to produce the interlayer film by forming a raw material resin into a film shape by a usual film forming process such as die extrusion process or calendar roll process. The production method of the interlayer film is however not limited to this film forming process.

Although an ordinary laminated glass is manufactured by sandwiching one continuous interlayer film between two glass sheets, the vehicle laminated glass according to the present disclosure is manufactured by arranging side by side and sandwiching an interlayer film part provided with at least one rigid layer and an interlayer film part formed of non-rigid layer between two glass sheets. In this manufacturing method, there occurs a seam between the two interlayer film parts. However, the interlayer film parts are fusion bonded to each other during heating and pressing in an autoclave so that the seam becomes unnoticeable and does not obstruct the vehicle passenger's view.

The vehicle window glass according to the present disclosure is characterized by being lighter in weight than conventional ordinary laminated glasses. For this reason, it is preferable that at least one of the first and second glass sheets is 2.0 mm or smaller in thickness. It is more preferable that the second glass sheet is 2.0 mm or smaller in thickness. It is still more preferable that both of the first and second glass sheets are 2.0 mm or smaller in thickness.

[First Glass Sheet]

There is no particular limitation on the first glass sheet of the vehicle window glass in the present disclosure. A known type of glass sheet can be used as the glass sheet of the vehicle window glass.

The thickness of the first glass sheet is preferably 1.4 mm to 2.2 mm.

There is also no particular limitation on the composition of the first glass sheet. The first glass sheet may be a sheet of chemically strengthened glass. The following compositions (1) and (2) are applicable as the preferable composition of the chemically strengthened glass;

(1) $SiO_2$: 65 to 57%, $Al_2O_3$: 0 to 5%, $Na_2O+K_2O$: 5 to 20%, MgO: 0 to 10% and CaO: 2 to 15% wherein the percentages are by mass; and (2) $SiO_2$: 55 to 65%, $B_2O_3$: 0 to 10%, $Al_2O_3$: 10 to 25%, $Na_2O+K_2O$: 10 to 20%, MgO: 0 to 10% and CaO: 0 to 5% wherein the percentages are by mass.

[Second Glass Sheet]

There is no particular limitation on the second glass sheet of the vehicle window glass according to the present disclosure. A known type of glass sheet can be used as the glass sheet of the vehicle window glass.

The thickness of the second glass sheet is preferably 0.7 mm to 1.8 mm.

There is also no particular limitation on the composition of the second glass sheet. The second glass sheet may be a sheet of chemically strengthened glass. The above-mentioned compositions (1) and (2) are applicable as the preferable composition of the chemically strengthened glass.

There is no particular limitation on the manufacturing method of the vehicle window glass (laminated glass pane) in the present disclosure. The laminated glass pane can be manufactured by a known method. For example, it is feasible to obtain the laminated glass pane as follows. First, the interlayer film is stacked between the first glass sheet and the second glass sheet. The resulting stacked assembly is degassed by e.g. passing the stacked assembly between press rolls or sucking the stacked assembly under vacuum in a rubber bag etc. After that, the stacked assembly is subjected to pre-bonding. The thus-obtained laminate is subjected to press bonding (with or without heating) by e.g. placing the laminate in an autoclave or pressing the laminate. The manufacturing method of the vehicle window glass is however not limited to this method.

Figure 8:
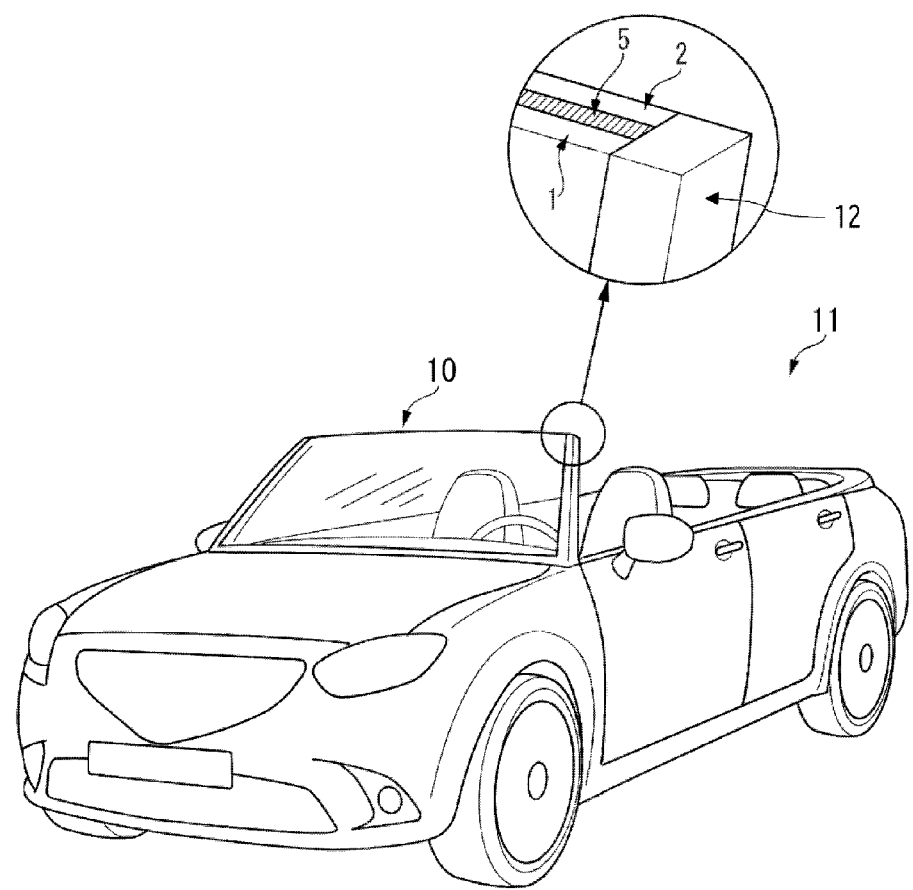
FIG. 8 is a schematic view showing an example of a vehicle to which the vehicle window glass is mounted.

One example of the vehicle 11 to which the vehicle window glass 10 according to the present disclosure is mounted is schematically shown in FIG. 8. The application of the vehicle window glass is however not limited to such a vehicle.

Experiment 1: Relationship Between Rigidity and Water Content of Interlayer Film As test samples of the interlayer film, the following interlayer film samples 1 to 4 were provided.

The Young's modulus of each of the interlayer film samples 1 to 4 refers to a value measured in an environment of temperature 23° C. and humidity 50 to 60%. The details of the Young's modulus measurement method of the interlayer film samples 1 to 4 are as follows.

The Young's modulus measurement of the interlayer film samples 1 to 4 was carried out according to JIS K 7161-1. The purpose of this measurement method is to determine the tensile modulus (Young's modulus) of a test specimen by, in a tensile test where the test specimen was pulled at a constant speed along its principle axis (length direction) until the stress or distortion (elongation) acting on the test specimen reached a predetermined value, measuring the stress or distortion acting on the test specimen.

The test machine used was a universal testing instrument ENSILON (RTC-2410) manufactured by A&D Company, Limited in compliance with JIS K 7161-1.

The test specimen used was prepared by machine cutting each of the interlayer film samples 1 to 4 into a No. 5 dumbbell-shaped tensile test piece in compliance with JIS K 6251.

The interlayer film sample 1 was 0.80 mm in thickness.
The interlayer film sample 2 was 0.85 mm in thickness.
The interlayer film sample 3 was 0.78 mm in thickness.
The interlayer film sample 4 was 0.80 mm in thickness.

The gage length of the respective test specimens was 33 mm.

The number of test specimens used was 1 for each interlayer film sample.

The prepared test specimen was kept in storage for 4 hours or more in an environment of temperature 23° C. and humidity 50 to 60%.

The tensile test was conducted under the same conditions of temperature 23° C. and humidity 50 to 60% as in the storage of the test specimen. In the tensile test, a reserve force (load: 20 nM, retention time: 10 sec) was applied to only the test specimen of the interlayer film sample 3. A reserve force was not applied to any of the test specimens of the interlayer film samples 1, 2 and 4 in the tensile test. The test speed of the tensile test was set to 0.33 mm/min, that is, a speed level at which there caused a distortion of 1% in the gage length for 1 minute.

The stress $\sigma$ [MPa] acting on the test specimen was determined by dividing the force F [N] applied to the test specimen at the measurement by the initial cross-sectional area A [mm$_2$] of the test specimen.

The distortion $\varepsilon$ [-] caused in the test specimen was determined by dividing the amount $\Delta L0$ [mm] of increase in the gage length of the test specimen by the gage length L0 [mm] of the test specimen.

The Young's modulus E of the test specimen was determined by dividing the difference between the stress $\sigma 2$ acting on the test specimen at a distortion $\varepsilon 2$ (0.25%) and the stress $\sigma 1$ acting on the test specimen at a distortion $\varepsilon 1$ (0.05%) by the difference between the distortion $\varepsilon 1$ and distortion $\varepsilon 2$.

In the present experiment, the stress, Young's modulus and distortion determination results were each rounded to two significant figures.

Interlayer film Sample 1: Saflex (registered trademark; the same applies to the following) RF 41 (manufactured by Eastman Chemical Company) as a low-elasticity PVB film of single layer structure with a Young's modulus E of 1.1 MPa Interlayer film Sample 2: Saflex QF51 (manufactured by Eastman Chemical Company) as a low-elasticity PVB film of three layer structure with a Young's modulus E of 1.3 MPa Interlayer film Sample 3: Saflex DG41 (manufactured by Eastman Chemical Company) as a high-elasticity PVB film of single layer structure with a Young's modulus E of 49 MPa Interlayer film Sample 4: S-LEC Clear Film HIRZN-10 (manufactured by Sekisui Chemical Co., Ltd.) as a low-elasticity PVB film of single layer structure with a Young's modulus E of 0.94 MPa Furthermore, the interlayer film samples 1 to 4 were tested for the variation in water content over time by the following procedure.

(1) Each of the interlayer film samples 1 to 4 was cut into a piece of 4 cm square. The weight of the cut piece was measured.

(2) The cut piece of the interlayer film sample was stored in a desiccator for several days, thereby removing the initial water content therefrom. (The water content removal operation was performed until there was seen no weight change in the cut piece of the interlayer film sample.) The weight of the cut piece of the interlayer film sample after the removal of the initial water content was measured. (This weight was read as the weight of the interlayer film sample before the test.)

(3) The cut piece of the interlayer film sample after the removal of the initial water content was put in a thermostat (temperature: 23° C., relative humidity: 60%). Not only the weight of the cut piece of the interlayer film sample but also the time-course variation in water content of the cut piece of the interlayer film sample were monitored. (The weight of the cut piece of the interlayer film sample at each monitoring time was read as the weight of the interlayer film sample after the test.)

The water content of the interlayer film sample was determined by the following equation (A).

$$\text{Water Content (\%)} = 100 \times \{\text{Weight (g) of Interlayer Film Sample after Test} - \text{Weight (g) of Interlayer Film Sample before Test}\} / \text{Weight (g) of Interlayer Film Sample after Test} \quad (A)$$

Figure 9:
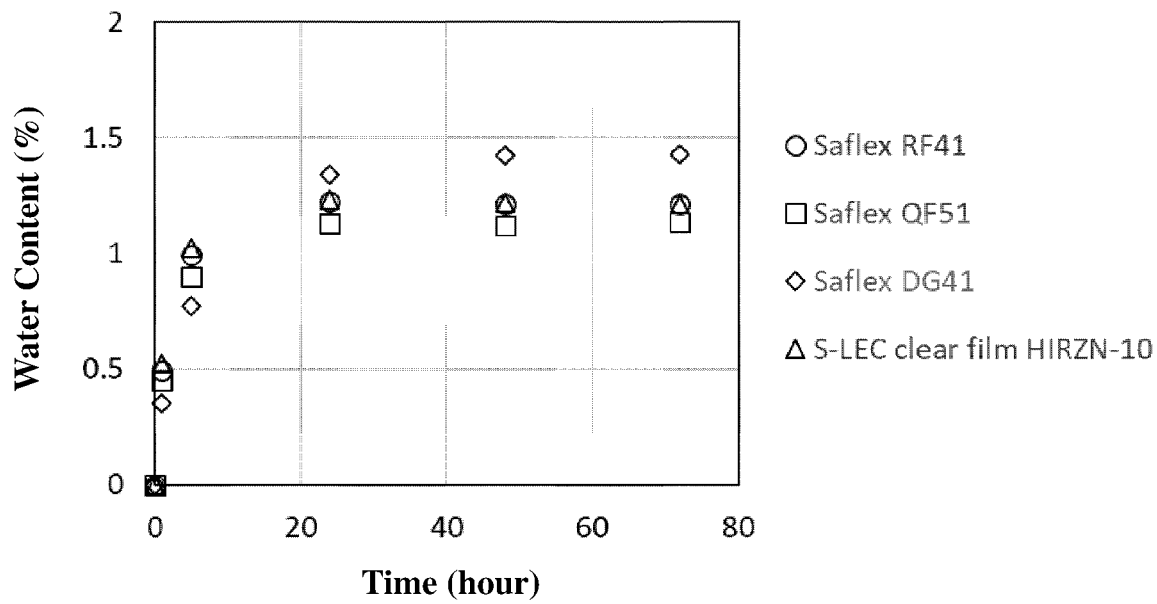
FIG. 9 is a graph showing a relationship between the rigidity and water content of the interlayer film.

The test results are shown in FIG. 9. It is apparent from the results of FIG. 9 that, even with the passage of time, the water content of the interlayer film sample 3 formed as the high-elasticity PVB film was higher than those of the interlayer film samples 1, 2 and 4 each formed as the low-elasticity PVB film. It can be said from these results that the high-rigidity interlayer film tends to be easier to absorb water than the low-rigidity interlayer film.

Experiment 2: Relationship Between Water Content of Interlayer Film and Pummel Value (1) Preparation of Laminated Glass Samples As the glass sheets, glass sheets B1 with a thickness of 1.8 mm or 2.1 mm and glass sheets B2 with a thickness of 0.70 mm or 1.1 mm were used in four combinations.

As the interlayer film, the interlayer film sample 2 or 3 was used in a state that the initial water content was removed as mentioned above.

The interlayer film sample was stacked between the glass sheet B1 and the glass sheet B2. The resulting stacked assembly was put in a rubber bag, and then, degassed by suction to remove air remaining between the glass sheets and the interlayer film. The stacked assembly was subsequently subjected to pre-bonding. The thus-obtained laminate was placed in an autoclave and subjected to bonding under the conditions shown in TABLE 1. After the pre-bonding, the laminated glass sample was taken out of the rubber bag. The finish bonding was also performed with the use of an autoclave under the conditions shown in TABLE 1.

There were thus obtained the following laminated glass samples.

Laminated Glass Sample C1: Glass Sheet B1/Interlayer Film Sample 2/Glass Sheet B2

Laminated Glass Sample C2: Glass Sheet B1/Interlayer Film Sample 3/Glass Sheet B2

TABLE 1

Bonding Conditions

| Process Step | Degassing Degree (kPa) | Maximum Temperature (° C.) | Maximum Pressure (MPa) | Retention Time (min) | Total Process Time (min) |
|---|---|---|---|---|---|
| Pre-Bonding | −82.4 | 90 | 0.245 | 30 | 55 |
| Finish Bonding | — | 135 | 1.275 | 25 | 120 |

(2) Pummel Test

The laminated glass samples C1 and C2 (each having a size of 300 mm×300 mm) were stored for about 17 hours in a constant temperature and humidity testing chamber cooled to −18° C. The respective samples were held at an interval of about 1 cm by means of a glass stand.

Each of the laminated glass samples C1 and C2 was taken out from the constant temperature and humidity testing chamber and immediately hit with a hammer. An iron plate with a thickness of 13 mm was used as the hit stage in a state of being inclined at 45°. The hammer used had a head with a weight of about 500 g and a diameter of 30 mm. The angle between the hit stage and the sample was set to about 5 degrees. The hammer was swung down to the sample such that the entire head face of the hammer was brought into contact with the glass surface.

Herein, a corner region of the sample with an area of 100 mm×100 mm was hit from the glass sheet B1 side. After the first row of hits was given by the hammer, the hammer was return to give the second row of hits such that the second row of hits overlapped about half of the first row of hits.

It was confirmed that the hit surface of the glass sheet was totally broken.

After the test of one sample was finished, another sample was taken out from the constant temperature and humidity testing chamber and tested in the same manner as above.

After the completion of the above test procedure, the samples were left for about 1 hour at room temperature to completely remove dew condensation.

The Pummel value of each of the samples was determined by comparing an exposed surface of the interlayer film of the sample with pummel value judgment samples (for judgment of Pummel values of 2 to 8). The adhesion of the sample at the hit surface was evaluated based on the Pummel value.

The relationship shown in TABLE 2 holds between the Pummel value and the adhesion at the hit surface. As seen from TABLE 2, the lower the Pummel value, the higher the degree of exposure of the interlayer film, the more likely there will occur separation between the glass sheets and the interlayer film.

TABLE 2

Pummel Value and Adhesion at Hit Surface

| Exposure Degree (area %) of Interlayer Film | Pummel Value |
|---|---|
| 100 | 0 |
| 90 | 1 |
| 85 | 2 |
| 60 | 3 |
| 40 | 4 |
| 20 | 5 |
| 10 | 6 |
| 5 | 7 |
| 2 or less | 8 |

(3) Water Content

The near-infrared spectrum of each laminated glass sample was measured. The ratio of absorption attributed to PVB (methylene group) and adsorption attributed to water in the measured spectrum was analyzed. Based on this analytical result, the water content of the interlayer film was determined using an equation derived from a calibration curve. Herein, the measurement point was set at a position of 5 to 10 cm toward the center from the edge of the glass sample.

The measurement was made with the use of a spectrophotometer available (as U-4000) from Hitachi Hi-Tech Corporation. The determination of the water content was carried out by taking the absorption band of water as 1925 nm and the absorption band of methylene group as 1705 nm.

Figure 10:
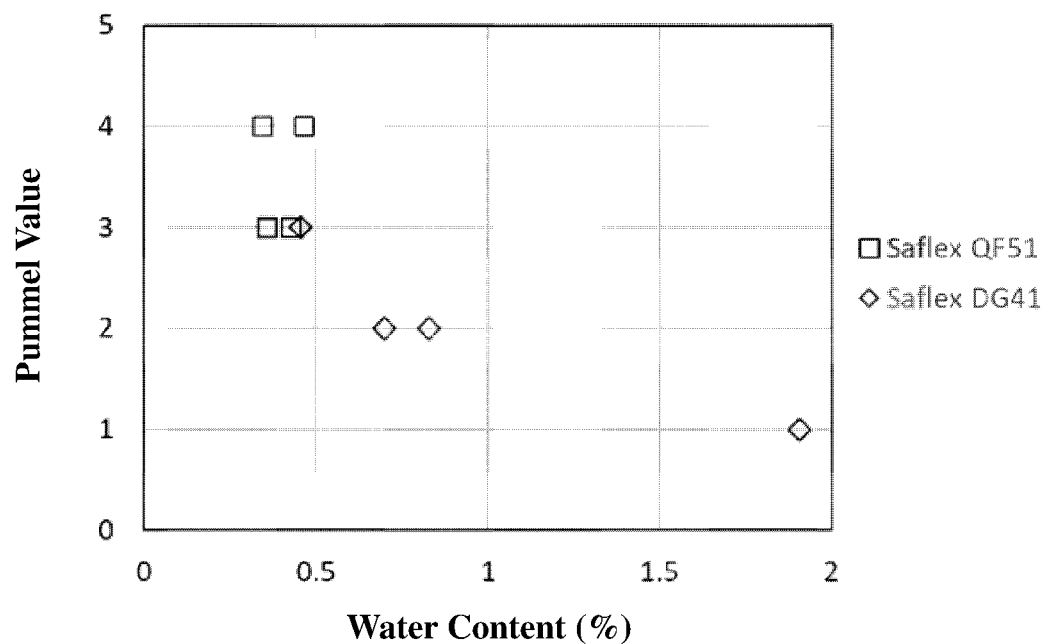
FIG. 10 is a graph showing a relationship between the water content of the interlayer film and the Pummel value.

The relationship between the water content of the interlayer film in a state of being adhered to the glass sheets and the Pummel value is shown in FIG. 10. In FIG. 10, the term "Saflex QF51" refers to the case where the laminated glass sample C1 was hit from the glass sheet B1 side; and the term "Saflex DG41" refers to the case where the laminated glass sample C2 was hit from the glass sheet B1 side.

As is apparent from the results of FIG. 9, in all of four types of the laminated glass sample C1 in which the interlayer film sample 2 formed as the low-elasticity PVD film was used, the water content of the interlayer film was 0.5% or lower. The amount of variation in the water content of the non-rigidity interlayer film was small in a state that the non-rigidity interlayer film was adhered to the glass sheets. By contrast, in three out of four types of the laminated glass sample C2 in which the interlayer film sample 3 formed as the high-elasticity PVB film was used, the water content of the interlayer film exceeded 0.5%. The amount of variation in the water content of the high-rigidity interlayer film was large in a state that the high-rigidity interlayer film was adhered to the glass sheets. When the water content was lower than 0.5%, the laminated glass sample exhibited a good Pummel value as in the case of laminated glass panes with conventional interlayer films. When the water content became higher than 0.5% by water absorption, however, the pummel value of the laminated glass sample was deteriorated so that separation of the glass sheets was likely to occur. It can be said from these data that, in a state that the high-rigidity interlayer film is adhered to the glass sheets, it is possible to control the water content of the high-rigidity interlayer film to 0.5% or lower and avoid a deterioration of the Pummel value by using the non-rigidity interlayer film to prevent absorption of water from the end portion of the interlayer film during or after the manufacturing of the laminated glass pane.

It has been shown by the results of the Experiments 1 and 2 that the high-rigidity interlayer film is easy to absorb water in a state of being adhered to the glass sheets and becomes more likely to be separated from the glass sheets when the water content of the interlayer film exceeds 0.5% by water absorption. The present inventors have found from these results that the vehicle window glass is provided, which is high in rigidity and less likely to cause separation at the end side of the window glass, by surrounding the high-rigidity interlayer film with the low-rigidity interlayer film so as to prevent absorption of water into the high-rigidity interlayer film from the outside through the end face of the laminated glass.

For example, the above-mentioned interlayer film sample 3 is usable as the relatively high-rigidity main part 4 of the vehicle window glass according to the present disclosure; and the above-mentioned interlayer film sample 1, 2, 4 is usable as the relatively low-rigidity peripheral part 5 of the vehicle window glass according to the present disclosure.

INDUSTRIAL APPLICABILITY

The vehicle window glass according to the present disclosure is applicable to a windshield or side windows where end faces of the laminated glass and the interlayer film are exposed to air. Further, the vehicle window glass according to the present disclosure is able to suppress separation of the glass sheet caused at the end side of the window glass due to absorption of water into the interlayer film during storage or transportation under high humidity conditions, and thus is suitable for e.g. land or sea shipping uses where no humidity control is exercised.

The invention claimed is:

1. A vehicle window glass, comprising:
a first glass sheet having a first surface facing a vehicle exterior side and a second surface located opposite the first surface;
a second glass sheet having a fourth surface facing a vehicle interior side and a third surface located opposite the fourth surface; and
an interlayer film sandwiched between the first glass sheet and the second glass sheet and facing the second and third surfaces,
wherein the interlayer film is arranged such that at least one end face of the interlayer film is exposed to the air,
wherein the interlayer film comprises a main part provided with at least one rigid layer and a peripheral part disposed at a location adjacent to the main part and along at least one side of the vehicle window glass and formed of a non-rigid layer,
wherein the at least one rigid layer has a water content controlled to 0.5% or lower as measured by near-infrared spectroscopy, and
wherein at least one of the first and second glass sheets has a thickness of 2.0 mm or smaller.

2. The vehicle window glass according to claim 1, wherein a Young's modulus of the main part of the interlayer film is 2.5 MPa to 200 MPa.

3. The vehicle window glass according to claim 1, wherein a Young's modulus of the peripheral part of the interlayer film is 0.1 MPa to 2.0 MPa.

4. The vehicle window glass according to claim 1, wherein a width of the peripheral part is 50 mm to 300 mm.

5. The vehicle window glass according to claim 1, wherein the peripheral part lies along all sides of the vehicle window glass.

6. The vehicle window glass according to claim 1, wherein the first glass sheet has a thickness of 1.4 mm to 2.2 mm.

7. The vehicle window glass according to claim 1, wherein the second glass sheet has a thickness of 0.5 mm to 1.8 mm.

8. The vehicle window glass according to claim 1, wherein the non-rigid layer has a water content of 0.5% or lower as measured by near-infrared spectroscopy.

9. The vehicle window glass according to claim 1, wherein a Young's modulus of the peripheral part of the interlayer film is lower than a Young's modulus of the main part of the interlayer film.

10. The vehicle window glass according to claim 1, wherein the peripheral part lies along a top side of the vehicle window glass.

11. The vehicle window glass according to claim 1, wherein the first glass plate has a composition of $SiO_2$: 65 to 57 mass %, $Al_2O_3$: 0 to 5 mass %, $Na_2O+K_2O$: 5 to 20 mass %, MgO: 0 to 10 mass % and CaO: 2 to 15 mass %, or a composition of SiO2: 55 to 65 mass %, $B_2O_3$: 0 to 10 mass %, $Al_2O_3$: 10 to 25 mass %, $Na_2O+K_2O$: 10 to 20 mass %, MgO: 0 to 10 mass % and CaO: 0 to 5 mass %.

12. The vehicle window glass according to claim 1, wherein the second glass plate has a composition comprising 65 to 57 mass % of $SiO_2$, 0 to 5 mass % of $Al_2O_3$, 5 to 20 mass % of $(Na_2O+K_2O)$, 0 to 10 mass % of MgO and 2 to 15 mass % of CaO, or a composition comprising 55 to 65 mass % of $SiO_2$, 0 to 10 mass % of $B_2O_3$, 10 to 25 mass % of $Al_2O_3$, 10 to 20 mass % of $Na_2O+K_2O$, 0 to 10 mass % of MgO and 0 to 5 mass % of CaO.

13. The vehicle window glass according to claim 1, wherein the rigid layer and non-rigid layer are made of PVB.

* * * * *